April 23, 1957 W. KADEN ET AL 2,789,528
PHOTOGRAPHIC FILM-TYPE INDICATING MEANS
Filed June 14, 1954
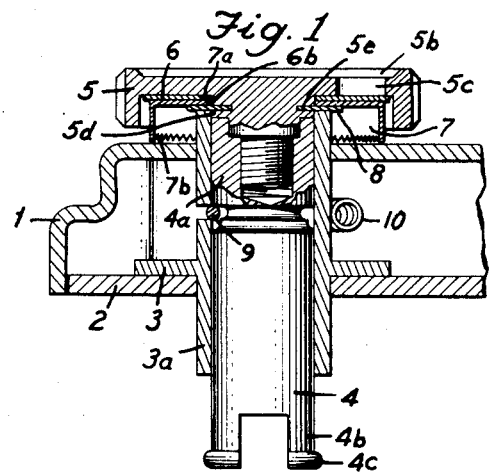
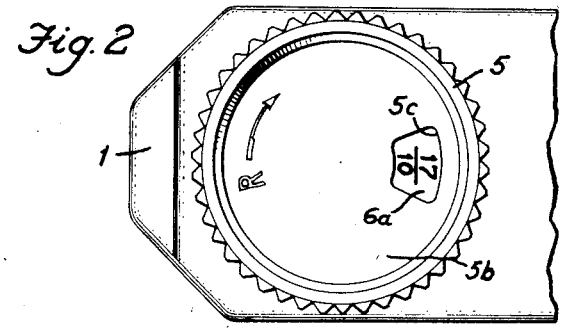
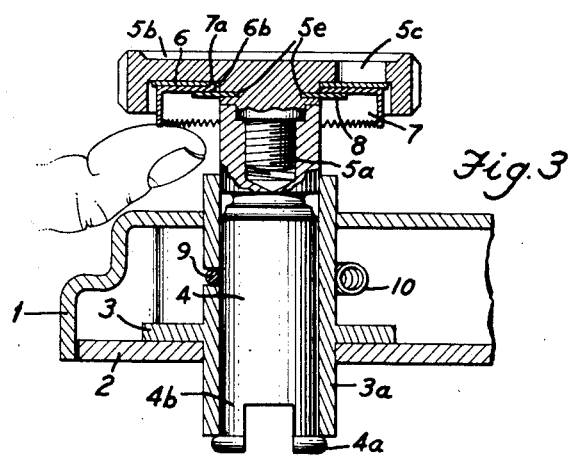
INVENTORS
WILLY KADEN
KARL BAMMESBERGER
BY Connolly and Hutz
ATTORNEYS United States Patent Office 2,789,528
Patented Apr. 23, 1957

2,789,528

PHOTOGRAPHIC FILM-TYPE INDICATING MEANS

Willy Kaden, Munich, and Karl Bammesberger, Munich-Untermenzing, Germany, assignors to AGFA Camera-Werk Aktiengesellschaft, Munich, Germany, a corporation of Germany Application June 14, 1954, Serial No. 436,680

Claims priority, application Germany July 1, 1953

7 Claims. (Cl. 116—114)

This invention relates to a device for use with a photographic camera, and particularly relates to a device for use with a camera wherein the film is rolled around a spool having an external operating knob; the invention comprising a device for indicating the type of film which is wound on the spool within the camera.

Heretofore, film type indicators of this general nature have been subject to inadvertent displacement during handling of the camera, such as when the camera is removed from its carrying case.

In order to avoid the above, as well as similar disadvantages of the previously known indicating devices, this invention provides an indicating device that can only be actuated when the rewinding knob on the spool has been pulled out. This invention is, therefore, characterized by an arrangement whereby the indicating device is preferably positioned in the film spool operating knob and is adjustable only from the underside of the knob when the knob has been pulled out.

In order that it may be possible to read the indicator at any time, there is advantageously provided a window-like opening at the front side of the knob and in this opening is adapted to appear the indicia or other indicating device. This indicia is preferably provided on a circular, flat disc which is concentrically positioned on the spool. The indicia may be engraved, etched, printed or otherwise provided on the upper face of the disc.

This concentric arrangement between the disc and the spool provides a sure, simple and effective type of indicating means which is easily adjusted and which is easily read.

The indicating disc is adapted to be adjusted by an adjusting handle, the connection between the adjusting handle and the indicating disc being very simple and consisting of relatively few parts which are simple in form and which may be quickly and easily assembled. In general, the indicating disc is connected to the adjusting handle by a detent or finger which extends from the knob into engagement with a slot in the disc. The rotation of the handle, thereby, acts to rotate the disc in the same direction. Preferably, the side of the adjusting handle which faces toward the camera is provided with teeth or is knurled, milled, roughened or the like in order to increase the grasping ability thereof. The adjusting handle and the disc connected thereto are fixed in their axial position by means of a spring disc or the like, the spring disc being adapted to be inserted in a ring groove provided on the shaft of the spool actuating knob, this shaft being threadedly engaged with the spool itself.

The advantage of the above-described arrangement lies not only in the fact that by reason of the simple, efficient and easily understood type of construction, only few and relatively cheap individual parts are necessary, but also in the fact that the indicating device is substantially foolproof and cannot be put out of adjustment by outside accidental influences.

The invention is illustrated in the drawing wherein:

Fig. 1 shows a vertical sectional view of one embodiment of the invention,

Fig. 2 shows a fragmentary top plan view of a camera embodying the invention, and Fig. 3 shows a vertical sectional view of the embodiment of Fig. 1 during the adjustment thereof.

Referring now in greater detail to the drawing wherein similar reference characters refer to similar parts, there is shown a camera housing provided with a cap 1 above the back plate 2 of the housing. A guide and distance bush 3 extends through the back plate 2 and cap 1, this guide being provided with a flange for seating on the plate 2. A spool axle 4 is slidably positioned within the guide bush 3 and is provided at its lower portion 4b with an enlargement or flange 4c. This flange 4c acts as a stop which abuts against the lower portion 3a of the guide 3 to limit outward movement of the knob 5.

The knob 5 is provided with a threaded shaft 5a which is threadedly engaged with an internally threaded bore 4a in the top of the spool axle 4. At the frontal face of the rewinding knob is provided a window-like opening 5c which extends through the front surface 5b of the knob. The disc 6, upon which the speed data 6a are provided, underlies the top surface of the knob within the confines of the externally threaded or knurled side flange of the knob. As best seen in Fig. 2, the indicating device on the disc, which here shows the camera adjusted for a film sensitivity of 17/10 Din, is framed within the window on the knob.

The coupling between the disc 6 and the adjusting handle 7 is provided by a lobe 7a extending upwardly from the handle 7 into a recess 6b formed in the disc 6. The underside of the handle 7 is provided with teeth, or is knurled, milled or the like, as indicated at 7b, so that it may be more easily grasped and manipulated. The spring disc 8 extends into a ring-like groove 5e on the shaft 5d of the knob 5, and underlies the handle 7 in such a manner that it frictionally holds the handle 7 and disc 6 in fixed axial position.

The clip 9 and spring 10 are provided for holding members on the spool, these members forming no part of the present invention.

From the above described structure it can be seen that the indicator remains in a fixed position relative to the knob and that in order to move such indicator from such position it is necessary to first lift the spool operating knob so that the adjusting handle can be reached.

Obviously many modifications and variations of the present invention are possible in the light of the above teachings. It is, therefore, to be understood that within the scope of the apppended claims the invention may be practiced otherwise than as specifically described.

The invention claimed is:

1. In a camera having a film spool therein and an externally positioned, axially movable, operating knob for rotating said spool, an indicating device entirely incorporated within said knob for indicating the type of film being used in said camera, said device being operatively connected to said knob in such a manner that said device can only be actuated when said knob is moved axially away from said camera.

2. The camera of claim 1 wherein said indicating device is positioned adjacent that surface of said knob which faces said camera, said knob encompassing said indicating device and wherein said knob is provided with a window through which indicating device may be seen.

3. The camera of claim 1 wherein said indicating device is a generally flat disc coaxial with said spool, said disc having indicating indicia thereon, and said knob including reference means for setting and reading said indicia.

4. In a camera having a film spool therein and an externally positioned, axially movable, operating knob for rotating said spool, an indicating device comprising a generally flat disc coaxial with said spool and underlying said knob, said disc having indicia thereon which may be seen through a window in said knob, said disc having actuating means connected to the under-surface thereof, said actuating means being adapted to rotate said disc on its axis.

5. The camera of claim 4 wherein said actuating means is provided with a roughened portion to enable it to be more easily grasped, said actuating means being accessible for grasping only when said knob and said disc are moved axially away from said camera.

6. The camera of claim 4 wherein said disc and said actuating means are held in axially fixed relationship by means of a resilient ring.

7. The camera of claim 6 wherein said resilient ring surrounds the shaft of said spool and has its inner edge positioned in a groove in said shaft, the outer portion of said ring being arranged to press said disc and said actuating means together in frictional relationship.

References Cited in the file of this patent

UNITED STATES PATENTS

| | | |
|---|---|---|
| 2,245,214 | Mihalyi | June 10, 1941 |
| 2,279,715 | Nagel | Apr. 14, 1942 |
| 2,350,733 | Drotning | June 6, 1944 |